Feb. 5, 1924.
J. A. EDEN, JR
1,482,390
FEED MECHANISM FOR BOLT TURNING AND OTHER MACHINES
Filed May 14, 1921
5 Sheets-Sheet 1
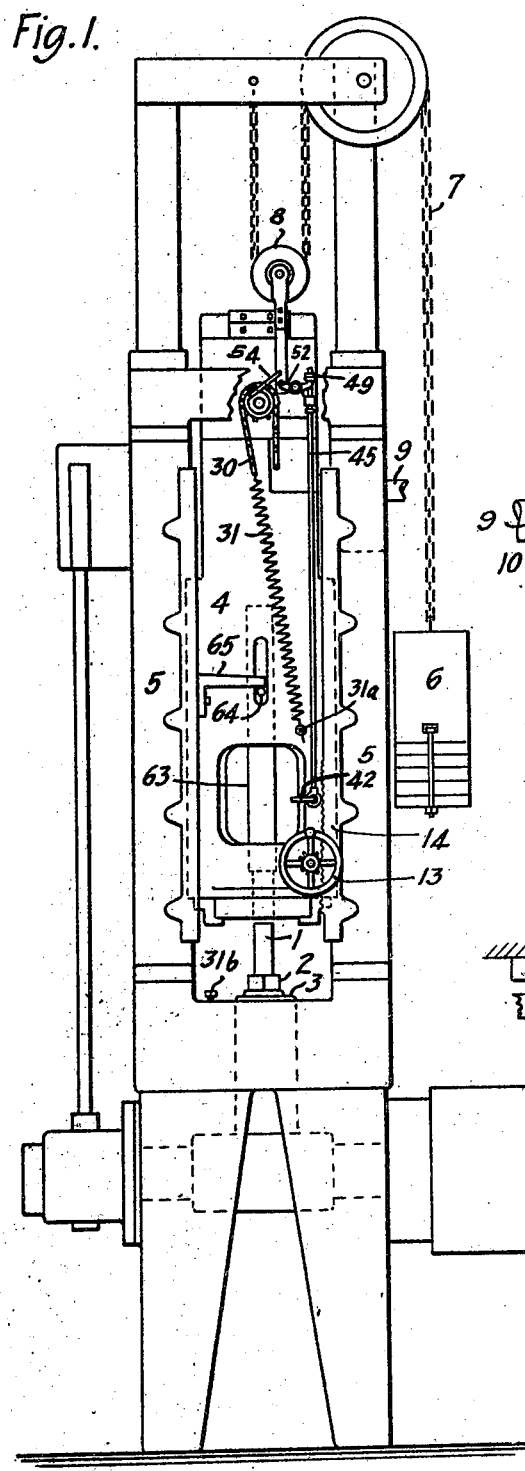
INVENTOR
BY James A. Eden, Jr.
ATTORNEY Feb. 5, 1924.

J. A. EDEN, JR 1,482,390

FEED MECHANISM FOR BOLT TURNING AND OTHER MACHINES

Filed May 14, 1921  5 Sheets-Sheet 2

INVENTOR
James A. Eden, Jr.
BY
D. Anthony Usina
ATTORNEY

Feb. 5, 1924.
J. A. EDEN, JR
1,482,390
FEED MECHANISM FOR BOLT TURNING AND OTHER MACHINES
Filed May 14, 1921     5 Sheets-Sheet 3
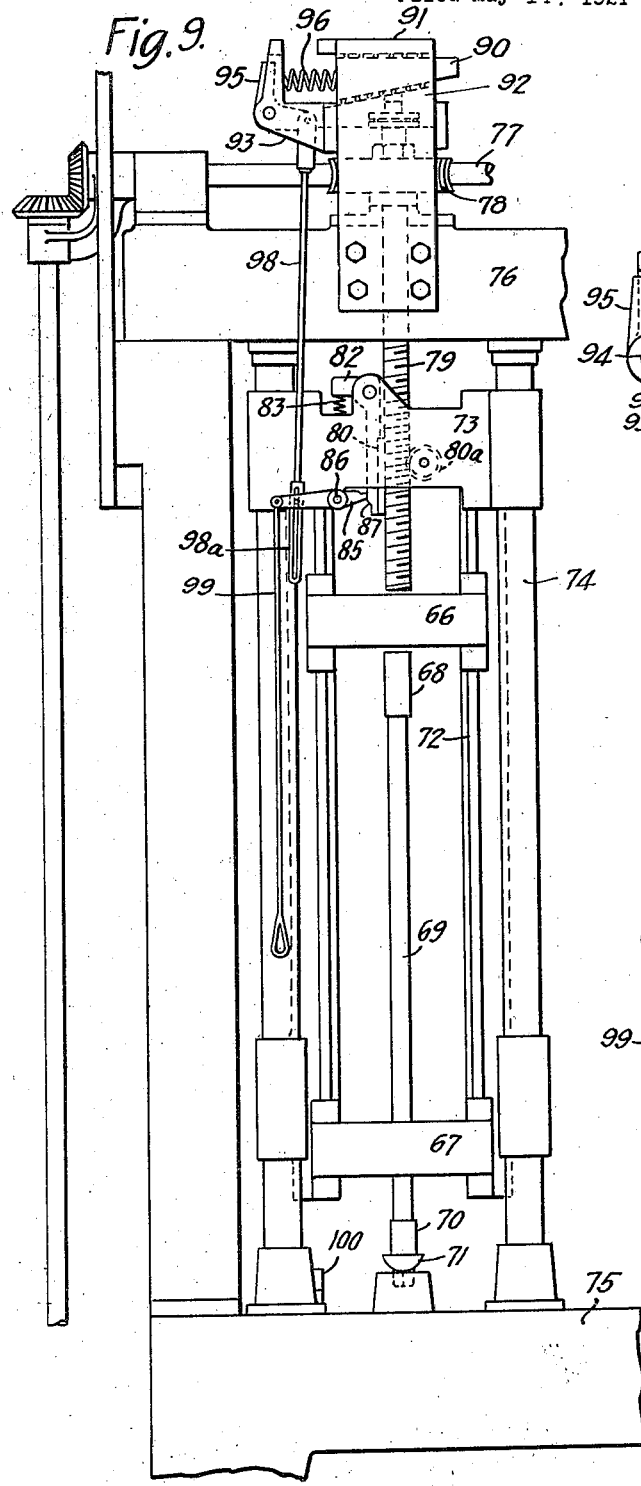
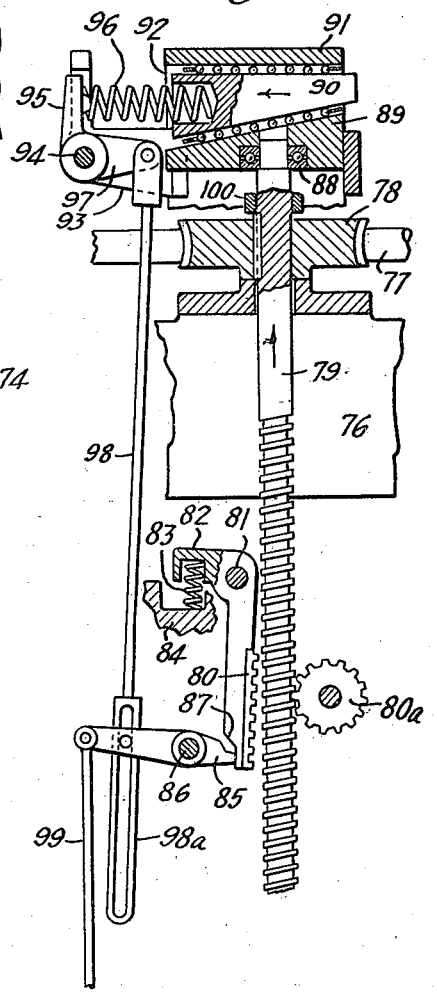
INVENTOR
James A. Eden, Jr.
BY
ATTORNEY Feb. 5, 1924. 1,482,390
J. A. EDEN, JR
FEED MECHANISM FOR BOLT TURNING AND OTHER MACHINES
Filed May 14, 1921 5 Sheets-Sheet 4

INVENTOR
James A. Eden, Jr.
BY
D. Anthony Usina, ATTORNEY

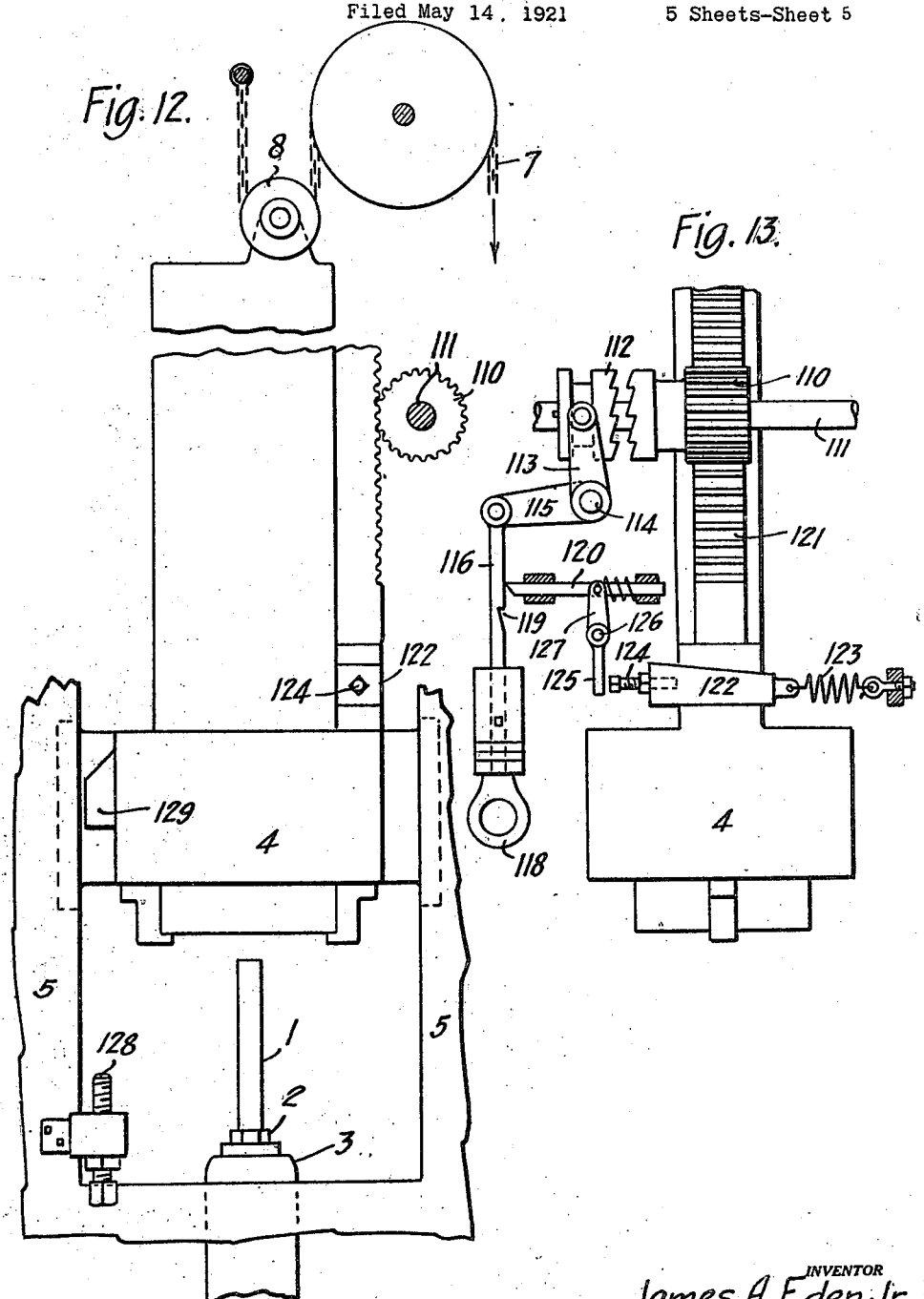

Patented Feb. 5, 1924.

1,482,390

UNITED STATES PATENT OFFICE.

JAMES A. EDEN, JR., OF SPRINGFIELD, MASSACHUSETTS, ASSIGNOR TO WALTER H. FOSTER, OF NEW YORK, N. Y.

FEED MECHANISM FOR BOLT-TURNING AND OTHER MACHINES.

Application filed May 14, 1921. Serial No. 469,533.

*To all whom it may concern:*

Be it known that I, JAMES A. EDEN, Jr., a citizen of the United States, residing at Springfield, county of Hampden, and State of Massachusetts, have invented certain new and useful Improvements in Feed Mechanism for Bolt-Turning and Other Machines, of which the following is a specification.

My invention provides an improvement which automatically controls to a desired extent the feed of a tool as the resistance thereto increases; and is particularly applicable to bolt-turning machines so as to control the feed as the cutting tool approaches a head or other enlargement on the blank.

The accompanying drawings illustrate embodiments of my invention.

Fig. 1 is a front elevation of a bolt-turning machine and Fig. 2 is a side elevation of the traveling cutter head and adjacent parts;

Fig. 3 is a detail substantially in section on the line 3—3 of Fig. 2;

Fig. 4 is a detail in horizontal section of the lower end of the tripping shaft;

Figs. 9 and 10 illustrate a modified form of machine embodying the invention; Fig. 9 being a front elevation and Fig. 10 a longitudinal vertical section of parts thereof;

Figs. 12 and 13 illustrate another embodiment of the invention, Fig. 12 being a diagrammatic side elevation and Fig. 13 a rear elevation.

Figure 5:
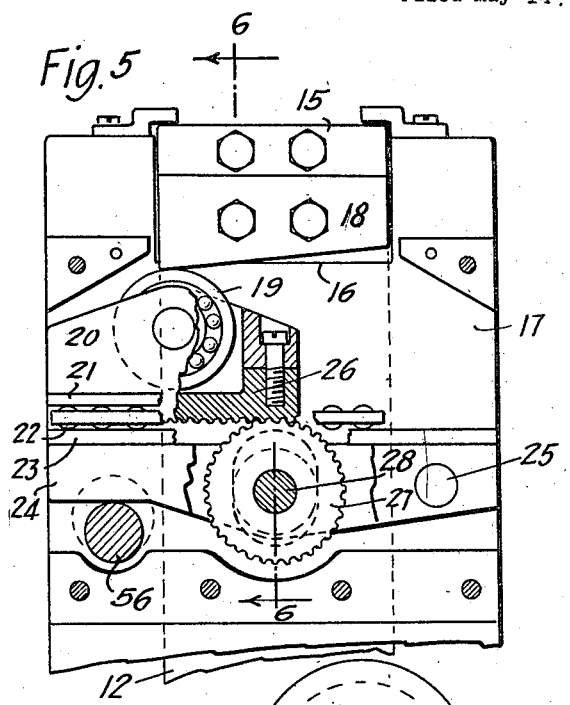
Fig. 5 is a front elevation of the upper part of the head, with the front plate and other parts removed.

Referring first to the machine illustrated in Figs. 1 to 8, the bolt blank 1 rests in inverted position with its head 2 in a socket 3 which is rotated while a head 4, carrying the usual cutting blades, is fed downward between upright guides 5. The head is lifted by means of a counter-weight 6 and chain 7 leading over suitable guide pulleys including a pulley 8 carried by the upper part of the head. The head is fed downward from a shaft 9 extending horizontally at the back of the machine. Generally a number of machines of the type illustrated are placed side by side with a common shaft at the back for driving them. As shown in Figs. 2 and 3 the shaft 9 carries a pinion 10 which is free to turn on the shaft, and a clutch sleeve 11 splined to the shaft clutches the pinion 10; the latter in turn engaging a rack 12 mounted on the back of the traveling head of the machine. When the pinion is unclutched from the shaft the head rises under the pull of its counter-weight. When a new blank is to be turned the pinion is clutched in again by hand and feeds the head down.

Machines of this type are known and the details of the cutters and driving mechanism are not illustrated; the invention being applicable to any usual or suitable design of such a machine. These machines work on blanks which are more or less irregular in thickness of the head as well as in the shank, and the stopping of the operation just at the right time to produce a well faced head without injuring the cutting tools involves some difficulty and loss of time and consequently of output of the machine. If the head of the blank is of extra thickness the cutters tend to bite into it and to be injured. The usual practice is to stop the automatic feed just before the cutters reach the head and then to continue the feed carefully by means of a hand wheel 13 mounted on the lower part of the head and carrying a pinion engaging a rack 14 mounted on one of the upright side frames 5. This hand operation means delay because one operator usually attends several machines and there may be a considerable interval of time after the machine stops before the operator can finish the feed, and because such hand feeding is naturally slow. And the operator has to be very skillful to get the best results. By my invention the need of stopping the machine before the work is done is avoided and the last stages of the feed are accomplished automatically through a relieving device which avoids injury to the tools, and is stopped when the work is completed. These desirable ends are secured by a construction which is rugged notwithstanding its flexibility.

Figure 6:
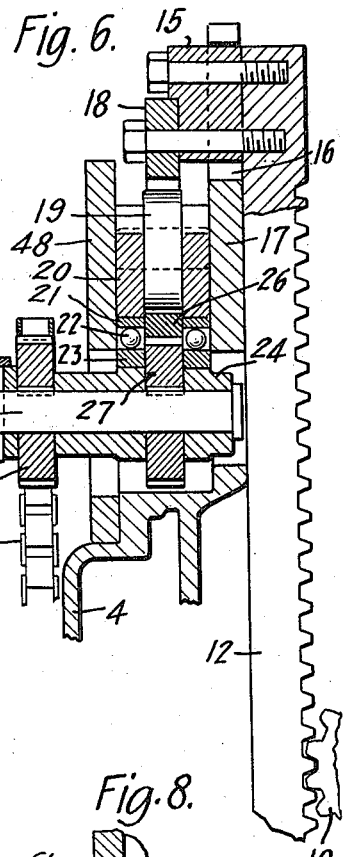
Fig. 6 is a section approximately on the line 6—6 thereof.
Figure 7:
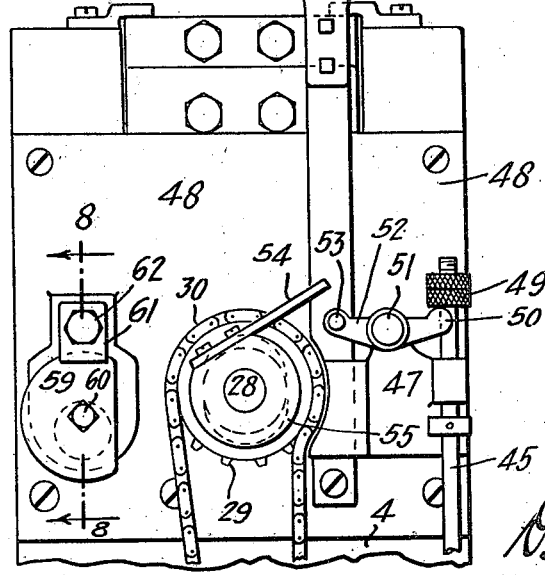
Fig. 7 is a front elevation of the upper part of the head complete.
Figure 8:
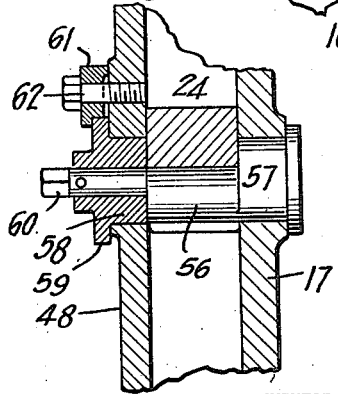
Fig. 8 is a section of a detail on the line 8—8 of Fig. 7.

The rack 12 presses the cutter head forward through a yielding device so that the head advances along the shank of the bolt at a substantially uniform rate. And when the cutters meet the head of the blank or any other enlargement, the feed becomes slower. As illustrated in Figs. 5 and 6, the rack carries a forward projection 15 having a slight vertical movement in a slot 16 in the upper end of the back plate 17 of the upper part of the cutter head. The projection 15 carries on its forward face a wedge or plate 18 having an inclined lower edge which bears on an anti-friction roller 19 carried by a cross-slide 20. The opposite sides of the cross-slide carry at their lower edges strips 21 which bear through balls 22 on tracks 23 which are carried on a supporting plate 24 normally fixed but adjustably pivoted at one side by a pin 25 to the back 17 of the cutter head.

The slide 20 carries on its lower edge a rack 26 which is in engagement with a pinion 27 on a shaft 28 which is mounted in bearings in the supporting member 24 and projects forward and carries a sprocket wheel 29 beyond the front face of the cutter head. Over this sprocket wheel passes a chain 30 fixed at one end, Fig. 1, to the front of the cutter head and connected at its other end to a long spring 31 which extends down along the face of the cutter head and is fastened thereto at its lower end. This is the retracting spring for the slide 20 and tends by turning the shaft 28 and pinion 27 to the left, Fig. 5, to throw the cross-slide 20 to the left and to lift the cam 18 and the rack 12 with respect to the cutter head. This spring is sufficiently strong to hold the parts in the full retracted position when the cutter head is being lifted, and to hold the parts in approximately the same retracted position during an ordinary feeding operation. When the cutters meet the head of the blank or any enlargement thereof the resistance is increased. The rack and the cam 18 move downward at the same rate on the roller 19, the latter yields, causing the cross-head 20 to move to the right against the tension of the spring 31, and the downward movement or feed of the head is slowed to a degree commensurate with the resistance.

The strength of the spring 31 is adjusted by passing its lower end through a boss 31ª and fastening it in the desired position by means of a set screw.

On a fixed part of the machine there is a rigid stop for absolutely preventing further movement of the head. For this purpose I have shown an adjustable screw stop 31ᵇ on the base of the machine in the path of a side portion of the head.

When the cutters meet the head of the blank, the wedge or cross-slide will yield so as to take up part of the feed, and the actual advance of the cutting tools will be retarded so that the speed of operation will be reduced in proportion to the increased amount of work on the tools. The rigid stop 31ᵇ is so adjusted that it will be struck by the cutter head when the latter has reached the desired limit of its downward movement and has reduced the head of the blank to the exact thickness desired. Further movement of the tools being impossible, the operation of the feeding rack will be entirely taken up in moving the cross-slide; during which movement there will be a certain number of rotations of the blank, sufficient to secure a perfect facing of the bolt and to take out the spring of the machine, a point which is important for producing true work.

The mechanism operates, therefore, first to cut down the number of revolutions per unit of feed (say to two, four or six revolutions, as may be desired), the exact number of revolutions being controlled by the effective angle of the wedge according to the adjustment of the support 24 on the cross-slide, and being controlled also to some extent by the stiffness of the spring. The wedge mechanism multiplies the resistance of the spring in transmitting the movement of the feed rack to the cutters, the extent of multiplication being determined by the effective angle of the wedge. Instead of effecting the adjustment by moving the supporting plate 24, a new cam plate 18 may be substituted having its lower edge at a different inclination; or the adjustment of the plate 24 may be used for securing slight variations, and a new plate 18 inserted when a greater degree of adjustment is desired.

When this slow feed has been continued to reduce the thickness of the blank head as desired, the advance of the tools is stopped dead by the stop 31ᵇ and a perfect operation is secured.

Just before the roller 19 is forced to the end of its travel toward the right by the stopping of the advance of the cutter head, the feed rack is stopped. The clutch 11 which controls the feed pinion 10 is shifted by means of a fork 32, Figs. 2 and 3, having an arm 33 engaged by a forked arm 34, pivotally supported on the bracket 35 which is fixed on the back of one of the uprights 5 of the machine. This bracket carries also a bearing 36 for a shaft 37 which at its upper end carries a cam 38 bearing on the underside of the tail 39 of the forked arm 34 which actuates the clutch. The shaft 37 passes downward through a sleeve 38, Fig. 4, mounted to rotate in a bearing 39 carried on the lower part of the cutter head; the shaft being splined in the sleeve 38. The sleeve has at its lower end an arm 40 which is pivotally connected to a rod or link 41 passing through the side of the cutter head and terminating in a handle 42, Fig. 1. The rod 41 is pressed to the rear by means of a spring 43 bearing against a shoulder of the cutter head. At the front of the cutter head it passes through a fixed ring 44 and has a notch which is engaged by the end of a locking pin 45 passing down through the said ring 44. When the locking pin 45 is withdrawn upward the spring will cause the rod 41 to turn the sleeve 38 and shaft 37 in a direction to release the tail 39 of the arm 34 and the latter will be lifted by a spring 46 and will unclutch the driving pinion 10, leaving the cutter head free to rise under the pull of its counter-weight. The rising movement is limited as hereinafter described. When a new turning movement is to be effected the operator pulls the handle 42 of the rod until it is latched by the pin 45; the shaft 37 and 38 are turned and the clutch connects the driving pinion to its shaft and the feed re-commences.

The pin or latch 45 extends up through a bearing 47 mounted on the face of a covering plate 48 which covers the wedge mechanism at the top of the cutter head. At its upper end the pin 45 carries nuts or adjustable stops 49 which bear on an arm 50 pivotally mounted at 51 on the bracket 47 and connected to an arm 52 which has a pin 53 projecting laterally from its end in the path of a striking arm 54 carried on a disc 55 which is fixed on the end of th shaft 28. The parts are so arranged that as the shaft 28 is turned by the travel of the cross-slide 20 to the right, the arm 54 will turn toward the pin 53 and will strike the latter just before the limit of travel of the cross-slide has been reached. This will lift the pin and unlatch the rod 41 and cause the unclutching of the feed pinion, as described, which will be followed by the return of the cutter head to its upper position.

To adjust the machine to the resistance of the work to be done, the effective pitch of the feed controlling cam may be varied. This may be accomplished, for example, as shown in Figs. 1 to 8, by shifting the inclination of the supporting member 24 and of the tracks 23 on which the cross-slide travels. As these tracks approach parallelism with the inclined face of the cam 18, the resistance of the slide to lateral travel is increased, and vice versa. The supporting member 24 is held up at its lefthand end by an eccentric portion 56, Fig. 8, of a shaft 57, which is journalled in the back plate 17 and which carries at its forward end a bearing member 58 with a locking flange 59 thereon, the shaft having a squared end 60 for application of a wrench to turn it. A clamping member 61 has a flange overhanging the flange 59 and is fastened to the cover plate 48 by means of a bolt 62 by which it can be forced hard against the flange 59 and prevent the turning of the latter and of the eccentric shaft. The flange 59 is cut away at one side, see Fig. 7, so that it can be withdrawn by turning it until the cut away side comes under the clamp 61.

With this automatic control of the feed, the hand wheel 13, Figs. 1 and 2, may be eliminated. Or it may be left on the machine for special cases, turning idly as the cutter head moves up and down. The cutter head may carry the usual knock-out rod 63 extending through the upper part of the casing and carrying a pin 64 extending forward through a slot into the path of an arm 65 fixed on one of the side frames of the machine. As the machine is fed downward the upper end of the blank comes into contact with the lower end of the knock-out rod and lifts the latter for a slight distance between the end of the feed. As the cutter head rises, the blank sometimes sticks and is carried up with it. Near the top of the retracting movement, the pin 64 strikes the arm 65 and the knock-out rod is pressed downward, knocking the work out of the cutter head. When the pin 64 reaches the lower end of its slot it stops further upward movement of the cutter head, and is set to accomplish this at the desired limit.

Figs. 9 and 10 illustrate more or less diagrammatically the application of the invention to a cutter head which is fed by a worm shaft. This machine carries two cutter heads 66 and 67, the upper one designed to turn an enlargement 68 on the upper end of the blank 69, while the lower one turns an enlargement 70 on the lower end of the blank adjacent to the head 71 which is also to be faced. This is a type of stay-bolt known as a crown bolt. The two cutter heads are carried in relatively fixed positions on rods 72 suspended from a cross-head 73 which is guided on side posts 74 extending from a base 75 to an upper cross-bar 76. The upward return of the head 73 is by the usual weights or springs, the return mechanism being omitted for the sake of clearness. The drive is through an overhead horizontal shaft 77 engaging a worm 78 keyed on a vertical screw or worm shaft 79 which actually feeds the cutter heads downward. The feed shaft is arranged to permit a short vertical movement with the worm gear 78. Within the cross-head 73 is a sectional nut 80 which engages the feed shaft during a feeding operation and which is supported on a pivot 81 in the cross-head and provided with an arm 82 bearing against a spring 83 which bears at its opposite end against a fixed part 84 of the cross-head. A pivoted worm 80$^a$ engages the worm shaft on the side opposite the sectional gear 80, so as to hold the shaft in engagement with the latter during a feeding operation. A lever 85 pivoted at 86 on the cross-head has its forward end in position to engage a cam face 87 on the back of the nut to force the latter into engagement with the threaded shaft and hold it there.

At the upper end of the shaft it is carried in a bearing 88 in the lower part of a block 89 with an inclined upper face bearing through intermediate rollers or balls against the lower inclined face of a wedge 90, the upper face of which bears through rollers or balls against a flat abutment plate 91 which has at its ends downward flanges 92 by which it is fastened to the upper cross-bar 76 of the machine.

Projecting to one side from the plates 92 is a bracket 93 which carries the pivot 94 of the arm 95 which bears against a spring 96 pressing at its opposite end against the wedge 90 and tending to force it forward to press down on the block 89 and the feed shaft. Connecting with the arm 95 is an arm 97 connected to the upper end of a link 98 which at its lower end is connected to the lever 85. A rod 99 is also connected to the outer end of this lever and has a handle at the lower end by which it may be manipulated.

When the lever 85 is thrown up to the position of Fig. 9, the cross-head is connected to the feed shaft 79 and will be fed downward as the latter turns. The spring 96 is approximately strong enough to prevent any movement of the wedge during normal feeding. When the head of the blank is encountered, the continued turning of the feed shaft will cause a continued relative movement of the cutter heads; but at the same time the increased resistance will result in a gradual upward movement of the feed shaft and the cam block 89, the wedge 90 sliding to the left and compressing the spring. As this action continues, the resistance of the spring increases so that there is a gradual retardation of the actual feed of the cutters. When the spring is compressed to the desired limit it will push out the arm 95 and pull up the link 98 and free the locking arm 85 from the nut 80, allowing the latter to be forced out by its spring to the position of Fig. 10, where it is disengaged from the feed shaft, so that the cross-head and cutter heads may rise to their starting point. To permit the downward movement of the cross-head and the lever 85 with respect to the link 98, the latter carries an end piece 98ª having a pin and slot connection with the lever. The pin will travel in the slot and will strike the bottom of the slot just before the feed is to be terminated. Any further feeding movement of the cross-head 73 will swing the lever arm 85 downward and release the feed because of the engagement of the pin in the end of the slot in the member 98ª.

Likewise if the feeding movement of the cross-head be stopped by the striking of the lower cutter head against a rigid stop 100, Fig. 9, or be so slight as not to cause a disconnecting of the feed directly as described, there will be a corresponding reaction at the upper end and outward thrust of the wedge 90, and a lift of the link 98 will trip the arm 85 and disconnect the feed.

The upper pressure on the drive shaft being released the spring 96 will force the wedge 90 inward and press the cam head 89 and the drive shaft down to the starting position.

Figure 11:
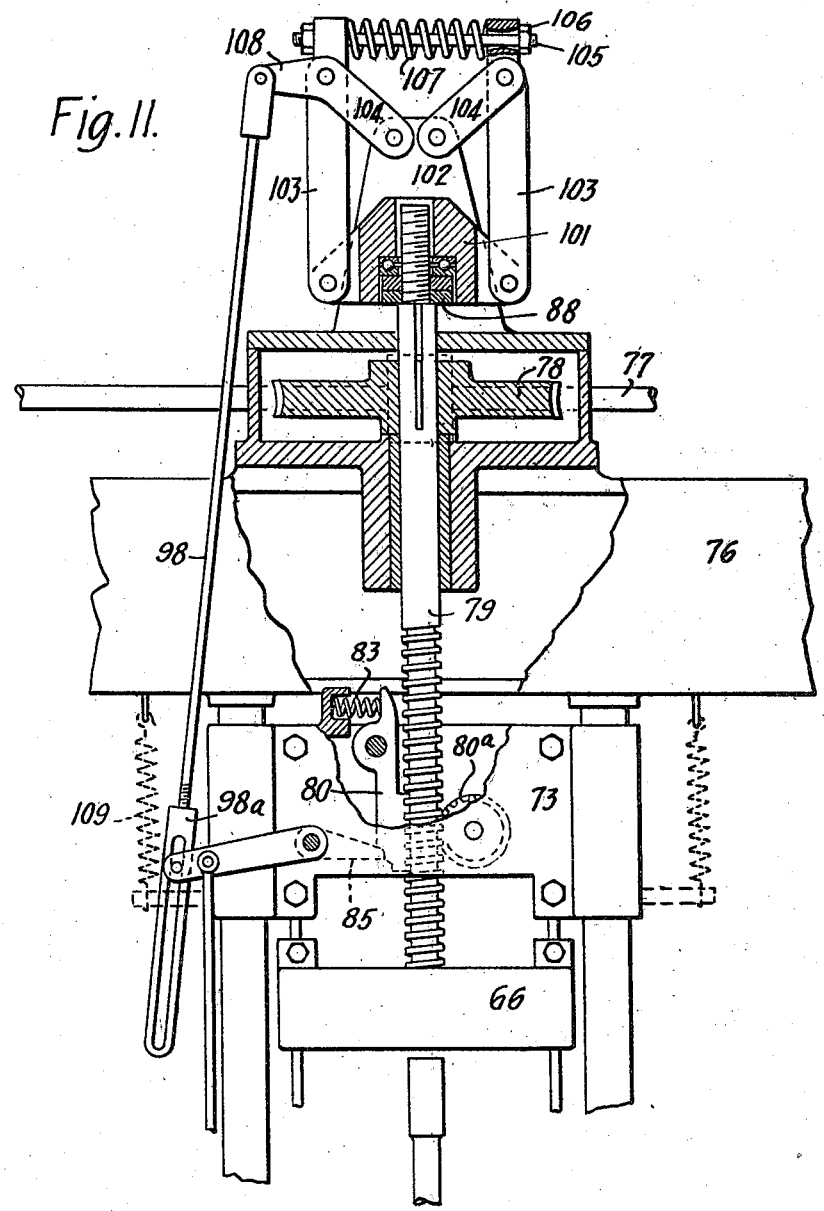
Fig. 11 is a longitudinal vertical section, with parts in elevation, illustrating another embodiment of the invention.

Fig. 11 shows a construction working on the same principle but utilizing a toggle instead of a wedge. The worm shaft 79 is keyed on and driven by a worm gear 78 which in turn is driven from an overhead shaft 77 as before, and the worm shaft engages a sectional nut 80 and a guide pinion 80ª in the cross-head 73 which carries the cutter heads, and the sectional nut is pressed in by a lever arm 85 and outward by a spring 83. The upper end bearing 88 of the feed shaft is carried in a block 101 which is guided between uprights 102 fixed on the frame of the machine. The block 101 carries upwardly projecting links 103 and the fixed member 102 carries links 104, each pair of links 103 and 104 being pivoted together to constitute a toggle. The links 103 project beyond the toggle points and a tie-rod 105 passes between their ends with stop nuts 106 for limiting their outward movement, and a coil spring 107 is arranged between them to press them outward. The resistance of this mechanism may be adjusted by means of the nuts 106. Screwing them together compresses the spring to increase its stiffness and at the same time carries the short toggle links 104 to a more nearly vertical position where their resistance to movement will be increased. One of the links 104 has an arm 108 connecting to the rod 98 which serves, when pulled upward, to trip the lever 85 and release the feed. Springs for lifting the head when the feed is disengaged are indicated at 109.

When the feed is in engagement the heads will move down until they encounter a considerable resistance, whereupon the head 101 of the feed shaft will be pressed upward, throwing the toggle arms 103 inward against the pressure of the spring 107 and thus retarding the actual feed of the cutters; until the desired limit of movement is reached, whereupon the arm 108 will be lifted sufficiently to trip the sectional nut and free it from the feed shaft and thus stop the feed.

In Figs. 12 and 13, I have illustrated diagrammatically the cutter-head and adjacent parts for a type of machine similar to that in Fig. 1, but with the wedge at the base instead of the top. Here a driving pinion 110 is mounted on a shaft 111 at the back of the lower part of the machine and adapted to be clutched to the shaft by a clutch member 112 engaged by a fork 113 on a shaft 114 having an arm 115 with a depending link 116 carrying at its lower end a weight 117 and a handle 118 and having on its inner side a locking notch 119. When the link 116 is pushed up by hand the latch pin 120 springs into the notch 119 and thus holds the clutch sleeve in engagement with the gear to cause a down feed of the cutter head 4.

The downward feed is through a rack 121 driven by the pinion 110 and bearing on the cutter-head not directly but through a wedge 122 which is held inward or to the right by an adjustable spring 123 and which will be pressed outward gradually as the cutters encounter increased resistance when they strike the head 2 of the blank. On the outer end of the wedge 102 is an adjustable tappet 124 adapted to engage the arm 125 on a short shaft 126 which carries an upper arm 127 having a slotted engagement with the latch pin 120; so that when the wedge 122 is forced out to a sufficient extent the latch pin will be withdrawn, the weight will pull down the link 116 and the pinion will be unclutched so as to permit the cutter-head to be lifted.

The limit of downward movement is determined by means of an adjustable stop 128 fixed on the base or side frame of the machine in the path of a projection 129 carried by the cutter-head 4. This stops the feed at a fixed point regardless of the pressure applied. In consequence, as the feed rack 121 continues to move downward, the wedge 122 will yield and move with comparative rapidity outward and trip the latch and disengage the clutch. The spring 123 may be adjusted to such strength as to yield before the cutter-head is absolutely stopped and to permit the unclutching of the feed. Thus if a serious resistance is encountered before the cutter-head has advanced to the level set for ordinary operations, there will be no injury to the cutters but a termination of the operation. The combination of fixed stop and spring, in this as well as in the previously described constructions, serves as a rigid limiting device for regular operations and a yielding limiting device for the exceptional case.

In an application of Savico, No. 461,089, filed April 13, 1921, there is illustrated a machine in which the cutter head is supported directly on springs which will yield when the resistance to the feed increases. My present invention is an improvement over that, in the interposition of a wedge, toggle or other movable part which may be made to serve any one or more of several functions, namely the multiplication of the resistance of the spring, the capability of accurate adjustment and the final tripping of the feed. In my construction the springs serve primarily to return the movable part or parts to their initial position, and the resistance is offered chiefly by the design and adjustment of such movable parts.

The same principles can be applied to various other types of bolt-turning machine, both vertical and horizontal, and in fact to various other machines in which the feed encounters an increased resistance and requires to be retarded or relieved. There are numerous machines in which the work is advanced instead of the tool, and my invention is applicable also to the feeding mechanism of such machines. The term "feed" is used here to refer to the relative longitudinal movement between the tool of the work, however secured. I have illustrated the relieving mechanism applied in each case to the part which is actually moved, but it will be understood that it is applicable also to the opposite part of the machine; as, for example, to the parts of the machines illustrated which carry the blank. Also the invention may be applied to machines for performing various other classes of work than the bolt-turning operations above described, and to machines using either one or a plurality of tools.

An advantageous feature of my invention is the protection of the machine from injury in case a solid body be interposed by accident under the tool carrier or in case of any accidental stoppage which might result in breakage of any part of the mechanism. If the carrier's advance is stopped by a rigid obstruction or by resistance which reaches a predetermined amount, the mechanism will not only take up the feed but after a short interval will stop the feed.

Though I have described with great particularity of detail certain embodiments of my invention, yet it is not to be understood therefrom that the invention is restricted to the particular embodiments disclosed. Various modifications thereof in detail and in the arrangement of the parts may be made by those skilled in the art without departure from the invention as defined in the following claims.

What I claim is:

1. A machine of the class described including in combination a vertical spindle with a chuck on its upper end for carrying and rotating the work, a tool carrier, means for feeding said carrier down on the work as the latter is rotated and means for adjustably decreasing the effective rate of feed.

2. A machine of the class described including in combination a tool carrier, feeding means and means for adjustably decreasing the effective rate of feed and thereafter stopping the operation of the feeding means and automatically restoring said carrier to its starting position.

3. A machine of the class described including in combination a tool carrier, feeding means, means for decreasing the effective rate of feed and for automatically stopping the advance of the tool for a determined interval during which said feeding means continues to operate and for automatically restoring said carrier to its starting position at the end of said interval.

4. A machine of the class described including in combination a tool carrier, feeding means, means for decreasing the effective rate of feed and for automatically stopping the advance of the tool for an interval during which said feeding means continues to operate and means for stopping the operation of said feeding means at the end of said interval and automatically restoring said carrier to its starting position.

5. A machine of the class described including in combination a vertical spindle with a chuck on its upper end for carrying and rotating the work, a tool carrier, and feeding means for feeding said carrier down on the work as the latter is rotated, said feeding means including a part which is movable from its normal position under an increased resistance.

6. A machine of the class described including in combination a tool carrier and feeding means including a part which is movable from its normal position under an increased resistance and means controlled by said movable part for stopping the operation of said feeding means.

7. A machine of the class described including in combination a tool carrier, feeding means, a spring arranged to resist the pressure of the feeding means and wedge mechanism for multiplying the resistance of the spring.

8. A machine of the class described including in combination a tool carrier, feeding means, a spring arranged to resist the pressure of the feeding means and wedge mechanism for multiplying the resistance of the spring, said wedge mechanism being adjustable to vary the effective angle of the wedge.

9. A machine of the class described including in combination a tool carrier, feeding means, a device for taking up the movement of the feeding means after the carrier's advance is stopped and means controlled by the movement of said take-up device for stopping the movement of the feeding means.

10. A machine of the class described including in combination a tool carrier, feeding means, a device for taking up the movement of the feeding means after the carrier's advance is stopped and a stop on the machine for limiting the advance of the carrier, and means controlled by said take-up device for stopping the movement of the feeding means.

11. A machine of the class described including in combination a tool carrier, feeding means, a device for taking up a part of the movement of the feeding means when the carrier's advance is retarded by an increased resistance and for taking up all such movement when the carrier's advance is stopped and means controlled by said take-up device for stopping the movement of said feeding means.

12. A machine of the class described including in combination a tool carrier, feeding means, and means operative at any point in the stroke when the carrier's advance is stopped for thereafter stopping the movement of the feeding means.

13. A machine of the class described including in combination a tool carrier, feeding means, and means operative at any point in the stroke when the carrier's advance is stopped for thereafter taking up a continued movement of the feeding means and then stopping such movement.

14. A machine of the class described including in combination a tool carrier, feeding means, and means operative at any point in the stroke when the carrier's advance meets a predetermined resistance from the work for stopping the movement of the feeding means.

15. A machine of the class described including in combination a tool carrier, feeding means, and means operative at any point in the stroke when the carrier's advance meets a predetermined resistance from the work for taking up a continued movement of the feeding means and then stopping such movement.

In witness whereof, I have hereunto signed my name.

JAMES A. EDEN, Jr.